US009552593B2

(12) United States Patent
Abad Fernandez et al.

(10) Patent No.: US 9,552,593 B2
(45) Date of Patent: Jan. 24, 2017

(54) SYSTEM AND METHOD FOR CROSS-SELLING

(71) Applicants: Tomas Abad Fernandez, Madrid (ES); Jorge de Haro Malmberg, Madrid (ES)

(72) Inventors: Tomas Abad Fernandez, Madrid (ES); Jorge de Haro Malmberg, Madrid (ES)

(73) Assignee: Retail Cross Selling, S. L. (ES)

( * ) Notice: Subject to any disclaimer, the term of this patent is extended or adjusted under 35 U.S.C. 154(b) by 0 days.

(21) Appl. No.: 14/474,123

(22) Filed: Aug. 30, 2014

(65) Prior Publication Data

US 2016/0063563 A1 Mar. 3, 2016

(51) Int. Cl.
*G06F 17/00* (2006.01)
*G06Q 30/02* (2012.01)
*G06Q 20/20* (2012.01)

(52) U.S. Cl.
CPC ........ *G06Q 30/0268* (2013.01); *G06Q 20/208* (2013.01)

(58) Field of Classification Search
CPC G06Q 30/0601; G06Q 30/0609; G06Q 20/20; G06Q 20/203
USPC ........................................ 235/375, 380, 383
See application file for complete search history.

(56) References Cited

U.S. PATENT DOCUMENTS

| 2009/0138365 A1* | 5/2009 | Mueller | G06Q 20/12 705/14.19 |
| 2012/0066064 A1* | 3/2012 | Yoder | G06Q 30/00 705/14.53 |
| 2014/0200976 A1* | 7/2014 | Smith | G06Q 30/0222 705/14.23 |

OTHER PUBLICATIONS

"User Manual—Basic Version," Retail Cross Selling, S.L., available prior to Aug. 31, 2013, 4 pages, includes English Translation.

* cited by examiner

*Primary Examiner* — Daniel St Cyr
(74) *Attorney, Agent, or Firm* — Stanley J. Gradisar Attorney At Law, LLC; Stanley J. Gradisar

(57) ABSTRACT

A scan and link system prompts salespersons or cashiers to recommend a certain product to a customer which is associated with, or complimentary to, a product that the customer wants to buy. The scan and link system and method improves customer attention and commercial profitability. Each time a product is scanned by a salesperson, scan and link software loaded on the cash register checks a database of associated or complimentary products and displays information on the cash register display via one or more advice pop-ups. The salesperson or cashier can suggest that the customer purchase the associated or complimentary products. The database of associated or complimentary products can be generated by the store owner, and/or by experts working in the specific industry of the user. Administration tools allow the user to change the position of the advice pop-up on the display, to hide it, or adjust its display frequency.

19 Claims, 17 Drawing Sheets

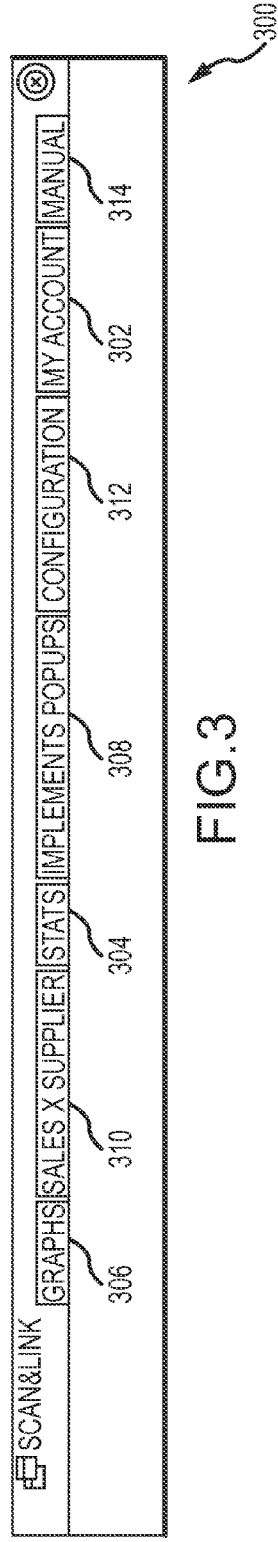

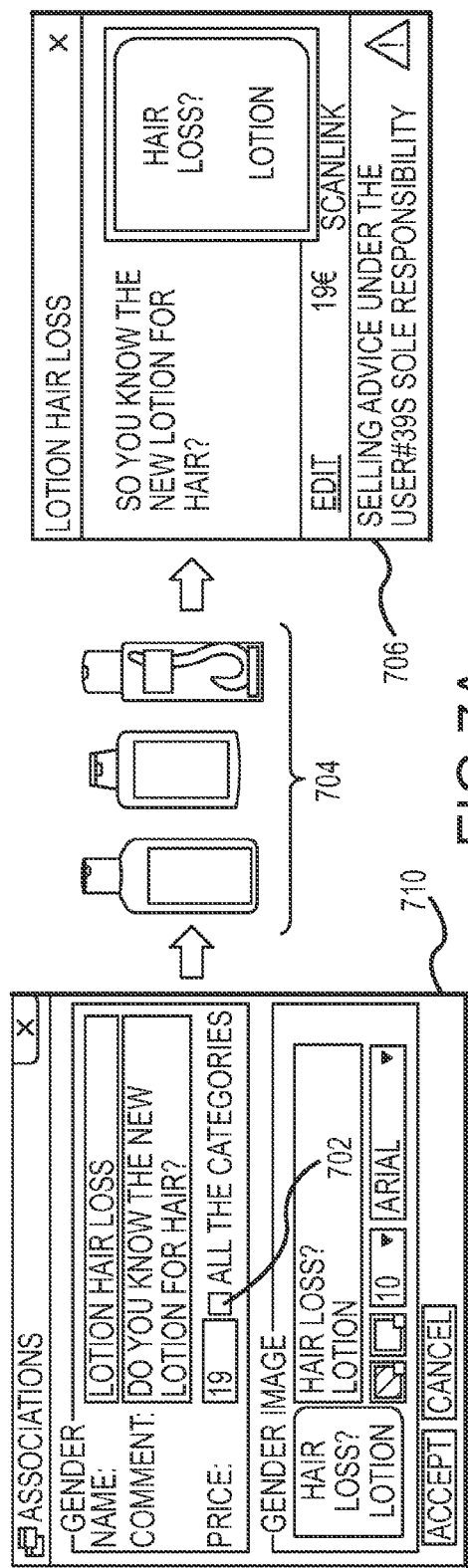
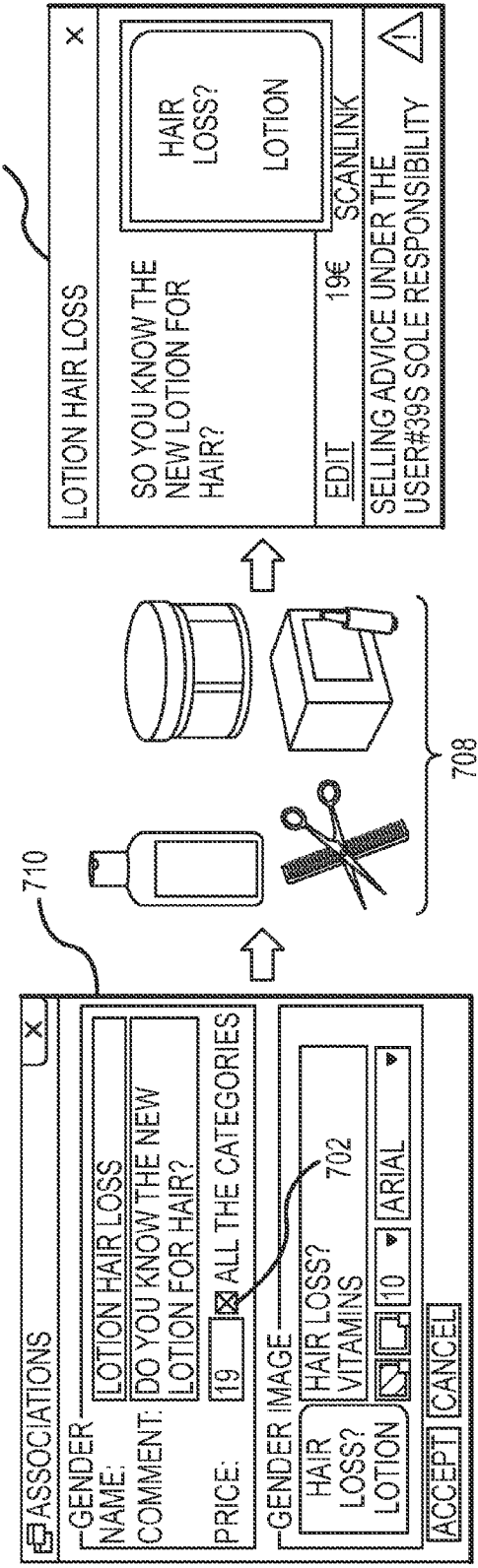
FIG. 7A
FIG. 7B

| SCAN&LINK | GRAPHS | SALES X SUPPLIER | STATS | IMPLEMENTS POPUPS | CONFIGURATION | MY ACCOUNT | MANUAL |

TOTAL PER SUPPLIER

| 1016 | SUPPLIER CODE ▼ | SEARCH |

PAGES: 1 ▼

TOTAL CROSS-SELLING | NAME OF THE SUPPLIER | UNITS/ 4.114 €

| ITEM1 | % | 03 | 04 | 05 | 06 | 07 | 08 | 09 | 10 | 11 | 12 | 01 | 02 | TOT | TOT GRAL |
|---|---|---|---|---|---|---|---|---|---|---|---|---|---|---|---|
| LOCIÓN DESPUÉS BAÑO NIÑO | 2% | 0 | 0 | 0 | 0 | 0 | 0 | 2 | 0 | 0 | 0 | 0 | 0 | 2 | 124 |
| CHITOSAN CAPTA GRASA | 100% | 0 | 0 | 0 | 0 | 0 | 0 | 0 | 0 | 22 | 33 | 0 | 0 | 55 | 55 |
| REPELENTE INSECTOS | 8% | 0 | 4 | 0 | 0 | 0 | 0 | 0 | 0 | 0 | 0 | 0 | 0 | 4 | 49 |
| CHITOSAN CAPTA GRASA | 100% | 0 | 0 | 0 | 0 | 0 | 0 | 0 | 0 | 0 | 0 | 36 | 0 | 36 | 36 |
| CREMA CONTORNO OJOS | 6% | 0 | 0 | 2 | 0 | 0 | 0 | 0 | 0 | 0 | 0 | 0 | 0 | 2 | 31 |
| CREMA HIDRATANTE DÍA | 3% | 0 | 0 | 0 | 1 | 0 | 0 | 0 | 0 | 0 | 0 | 0 | 0 | 1 | 31 |
| ACIDOS GRASOS OMEGA 3, | 100% | 0 | 0 | 0 | 0 | 0 | 0 | 0 | 0 | 0 | 0 | 18 | 0 | 18 | 18 |

EXPORT TO EXCEL

IMPORTANT! SCAN&LINK GUARANTEES THAT THE INFORMATION THAT APPEARS ON THIS SCREEN CAN ONLY BE ACCESSED BY THE CLIENT THAT MAY ACCESS IT BY IDENTIFYING ITSELF THROUGH ITS E-MAIL ADDRESS AND PASSWORD. IF THE CLIENT SUSPECTS THAT ITS PASSWORD MAY BE KNOWN BY UNAUTHORIZED THIRD PARTIES, IT SHOULD IMMEDIATELY CHANGE IT THROUGH THE PROCEDURE INDICATED IN THE APPLICATION USER MANUAL.

FIG.11

SYSTEM AND METHOD FOR CROSS-SELLING

NOTICE OF COPYRIGHT

Pursuant to 37 C.F.R. 1.71(e), applicants note that a portion of this disclosure contains material that is subject to and for which is claimed copyright protection, such as, but not limited to, source code listings, screen shots, user interfaces, or user instructions, or any other aspects of this submission for which copyright protection is or may be available in any jurisdiction. The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

BACKGROUND

It is quite common to have tools for cross-selling when shopping online. An online shopper selects an item to purchase, and based upon the selection, the online shopper is presented with suggestions of additional products that the online shopper could also purchase. What is needed in the art are systems and methods for cross-selling in-store at the point-of-sale, where cashiers are prompted, based upon the items purchased, to suggest complementary or associated products to the in-store customer.

SUMMARY

This Summary is provided to introduce in a simplified form a selection of concepts that are further described below in the Detailed Description. This Summary is not intended to identify key or essential features of the claimed subject matter, nor is it intended to be used to limit the scope of the claimed subject matter.

The detailed description below describes a system and method for cross-selling recommendations for given products. Sometimes products sold in certain stores are of a technical nature and their sale requires specific knowledge of the product. For such products, it is easy for salespersons or cashiers to forget to recommend an associated or complimentary product. Or, where a store sells a large number of different types of products, it may be impossible for the salespersons or cashiers to remember all of the complimentary and associated products to recommend to the customer. In seasonal periods, where a large number of temporary employees are hired, it may not be possible to train these temporary employees on all the products and their complimentary and associated items. To meet these needs, a system and method, referred to as scan and link, prompts the salespersons or cashiers to recommend a certain product to the customer which is associated with, or complimentary to, the product just sold to the customer. The scan and link system and method improves customer attention and commercial profitability. The scan and link solution will be described in greater detail below.

Each time a product is scanned by the salesperson or cashier, scan and link software loaded on the cash register checks a database of associated or complimentary products and displays information on the cash register via one or more advice pop-ups. The salesperson or cashier can suggest that the customer may want to purchase the associated or complimentary products. The cash register's computer has a high-speed Internet connection, such as asymmetric digital subscriber line (ADSL). The data retrieved by the scan and link software application is hosted on a secure server located in a specific site which complies with the required data protection protocols. The scan and link software application uses web services for remote access to the data and there is never a direct connection to the "main" database hosted in the server. The database of associated or complimentary products can be generated by the store owner, referred to herein as the user, and/or by experts working in the specific industry of the user. Examples of industries include, but are not limited to, pharmaceutical, nautical equipment, sporting goods, clothing, etc.

If the cashier or salesperson determines that a certain association with a purchased product is inadequate or could be improved, the cashier or salesperson may request its analysis or modification by clicking directly on the pop-up. The program will send a notice to the technical service department for the scan and link developer to verify if the associated advice is suitable, and if not, it can be corrected or cancelled. Scan and link offers an administration tool which allows the user to change the position of the pop-up on the display, to hide it, or adjust its display frequency, etc.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xm, Y1-Yn, and Z1-Zo, the phrase is intended to refer to a single element selected from X, Y, and Z, a combination of elements selected from the same class (e.g., X1 and X2) as well as a combination of elements selected from two or more classes (e.g., Y1 and Z3).

It is to be noted that the term "a entity" or "an entity" refers to one or more of that entity. As such, the terms "a" (or "an"), "one or more," and "at least one" can be used interchangeably herein. It is also to be noted that the terms "comprising," "including," and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof, shall include all those described in the summary of the invention, brief description of the drawings, detailed description, abstract, and claims themselves.

BRIEF DESCRIPTION OF THE SEVERAL VIEWS OF THE DRAWINGS

FIG. 3 shows a partial screen capture of the user interface top menu ribbon in an embodiment of the scan and link system.

FIG. 4 shows a screen capture of the My Account-Edit page in an embodiment of the scan and link system.

FIGS. 7A and 7B show screen captures showing the effect of associating all categories on advice pop-ups in an embodiment of the scan and link system.

FIG. 11 shows a screen capture of the sales x supplier page for analyzing the cross-selling performed by specific suppliers in an embodiment of the scan and link system.

DETAILED DESCRIPTION

Figure 1:
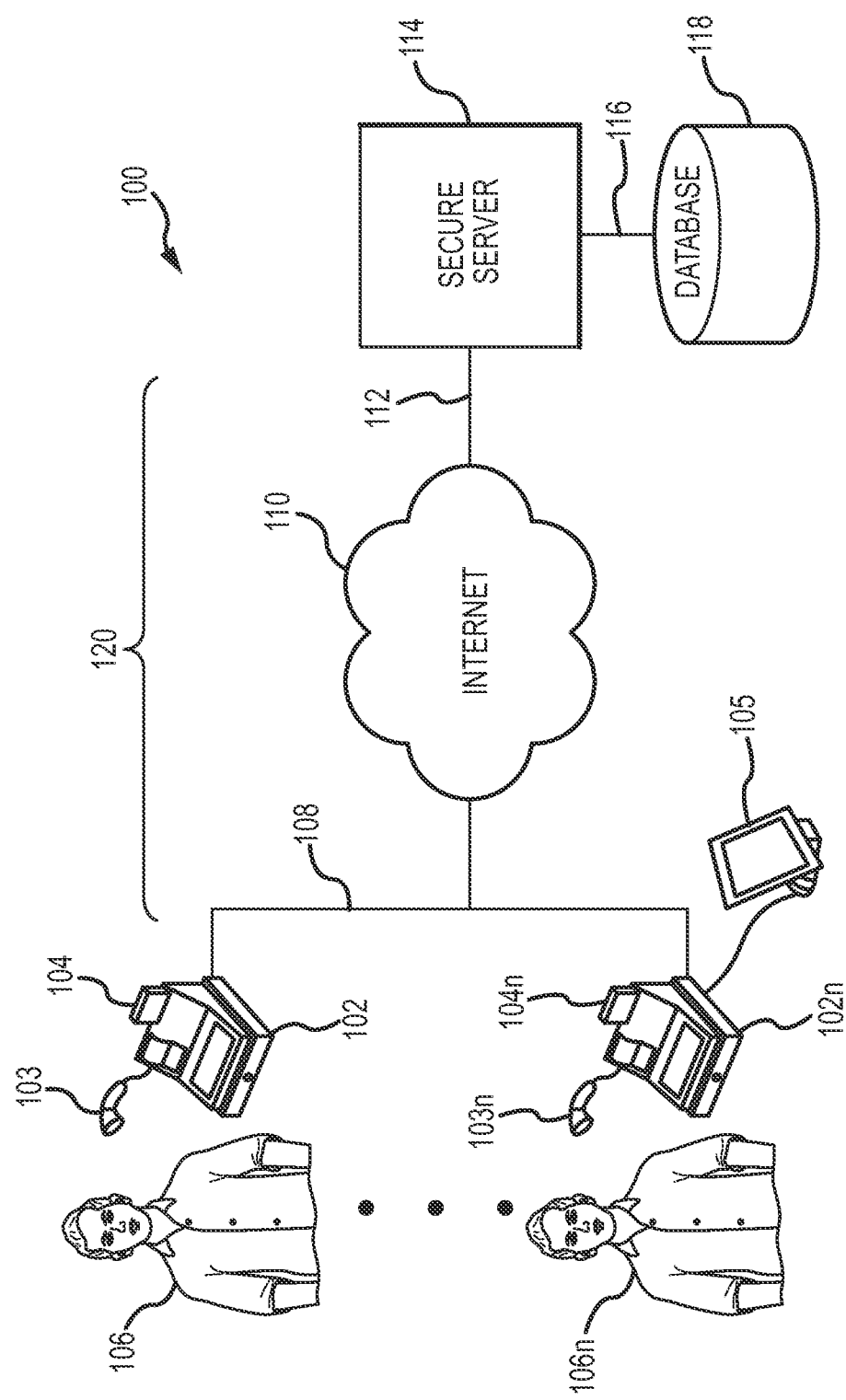
FIG. 1 shows a schematic/block diagram of an embodiment of the scan and link system.

The invention may be implemented as a computer, a computing system or as an article of manufacture such as a computer program product. The computer program product may be a computer storage medium readable by a computer system and encoding a computer program of instructions for executing a computer process.

With the computing environment in mind, embodiments of the present invention are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts, applications, or modules. It will be recognized by one skilled in the art that these operations, structural devices, acts, applications, and modules may be implemented in software, firmware, special purpose digital logic, and any combination thereof without deviating from the spirit and scope of the present invention as recited within the claims attached hereto.

Referring now to the figures, like reference numerals and names refer to structurally and/or functionally similar elements thereof, and if objects depicted in the figures that are covered by another object, as well as the tag line for the element number thereto, may be shown in dashed lines.

FIG. 1 shows a schematic/block diagram of an embodiment of the scan and link system. Referring now to FIG. 1, scan and link system 100 comprises a plurality of cash registers 102 to 102n, each having a display 104 to 104n and a built-in scanner and/or a handheld scanner 103 to 103n for scanning the barcodes on products purchased by a customer. The cash registers 102 to 102n are each operated by cashiers 106 to 106n. Some or all cash registers 102 to 102n may also have a connected computer screen or tablet 105 that can be turned or directed towards the customer so that the customer can see the advice pop-up that the cashiers 106 to 106n are seeing on displays 104 to 104n. Or, the cash register may have a dual screen, one facing the cashiers 106 to 106n and the other facing the customer. In addition, some cash registers have a credit card reader with a screen for receiving touch input from the customer than can also display information to the customer. Each cash register 102 to 102n is connected to the Internet 110 through a communications channel 108 and ultimately to secure server 114 through communications channel 112. In various embodiments, the cash registers 102 to 102n communicate collected data to, and receive data or instructions from, secure server 114 via any appropriate communications network 120, such as the Internet 110 employing communications channels 108 and 112. Secure server 114 accesses database 118 through communications channel 116.

The communication network 120 may be any combination of circuit switched, packet switched, analog, digital, wired, and wireless communication equipment and infrastructure suitable for transmitting signals from the cash registers 102 to 102n to the secure server 114. The communication network 120 therefore may include one or more of the following: intranet, the Internet, a cellular communication system, a wireless data system, a public switched telephone network, a private telephone network, a satellite communication system or point-to-point microwave system. Depending on the particular communication network utilized, cash registers 102 to 102n may send signals in accordance with a wireless application protocol, FCC 802.11 standards, a proprietary protocol, a high-speed Internet connection, such as asymmetric digital subscriber line (ADSL), or other types of communication protocols.

The scan and link system 100 is simple to use. Once a customer presents an item to cashier 106 for purchase, cashier 106 scans the barcode on the product with the built-in scanner or handheld scanner 103. The scan and link system 100 processes the barcode and returns an advice pop-up on the display 104. The advice pop-up appears quickly. In one embodiment, up to three advice pop-ups may be displayed at one time. The frequency, duration, and position of the display may be adjusted. The display of the advice pop-up may be suspended by the cashier 106 for a short period of time by simply pressing a key on the cash register 102. The advice pop-up includes an initial question that may help cashier 106 to open up a dialogue with the customer that is customer focused. The Cashier 106 may recommend an associated or complimentary product to the customer that is related to the product the customer is purchasing.

Figure 2:
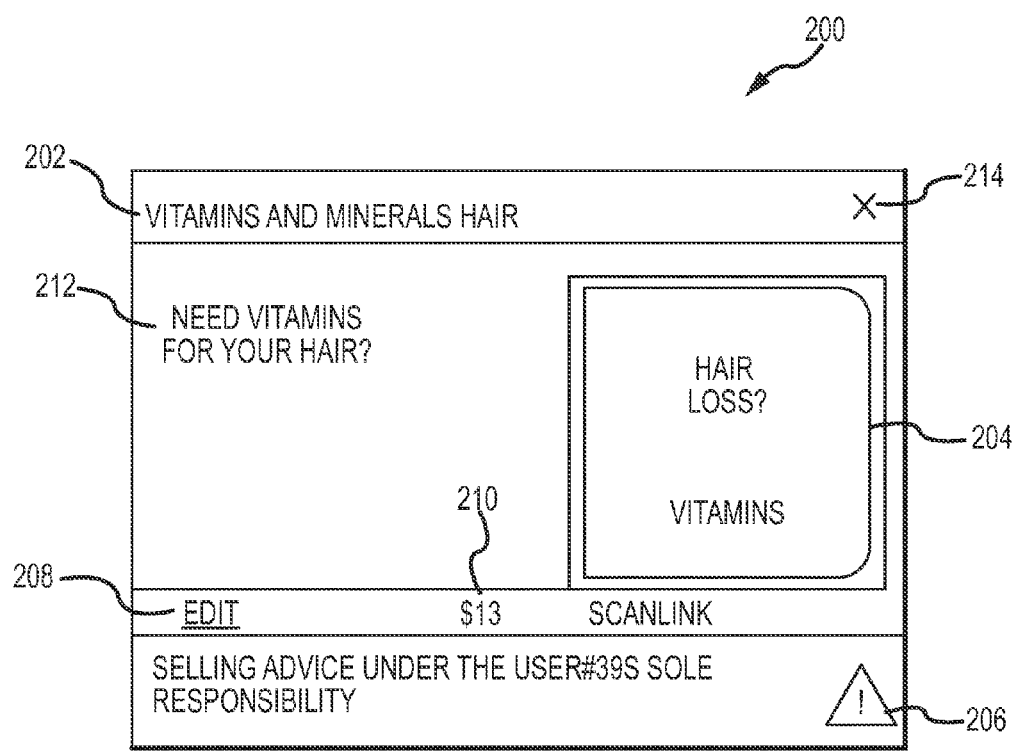
FIG. 2 shows a screen capture of an advice pop-up in an embodiment of the scan and link system.

FIG. 2 shows a screen capture of an advice pop-up in an embodiment of the scan and link system and method. Referring now to FIG. 2, in this illustrative example, a customer desires to purchase a bottle of lotion. Cashier 106 scans the barcode from the lotion and advice pop-up 200 is displayed on display 104 of cash register 102. The name 202 of this advice pop-up 200 is "Vitamins and minerals hair." The content of colored window 204 is not an image but is in fact editable text, which appears very fast. The color and text settings may be modified by the user. Clicking on warning symbol 206 allows cashier 106 to notify the scan and link system 100 of any unsuitable association for analysis and correction. The scan and link system 100 sends a notification to the technical service department of the scan and link system 100 developer in order to check the association and correct or delete it if necessary. By clicking on Edit 208 cashier 106 can modify advice pop-up 200 either for a specific recommendation, or for all the recommendations in which advice pop-up 200 is linked. Price 210 lets the cashier 106 know the approximate price for the associated or complimentary product, which in this example, is vitamins. Question 212 presents cashier 106 with a key question that encourages cashier 106 to follow the recommendation displayed. Providing question 212 helps cashier 106 to lose their "fear" in making the recommendation by giving cashier 106 the words to say, and also be able to recommend the associated or complimentary product more accurately and with more self-confidence. Cashier 106 can close out advice pop-up 200 by clicking on close symbol 214. Alternatively, instead of closing the window with close symbol 214, advice pop-up 200 can be closed by pressing the control key on the key pad of cash register 102. Advice pop-up 200 can be suspended for a period of time, fifteen minutes for example, by pressing the control key for three seconds. Advice pop-up 200 can be reactivated by pressing the control key again for three seconds. Advice pop-up 200 does not interfere with the other programs running on cash register 102.

In order to use the scan and link system 100 the user requests an activation code from the developer's website and receives an email that contains the access code and a link to the developer's website. From the computer of the cash register 102 the user wishes to install the scan and link software, the user accesses the developer's web site and chooses the option for program set-up. The user inputs their email address provided to the developer, and the activation code received in the email to allow the user to download the scan and link software onto the computer of the cash register 102. This installation procedure must be repeated for each of the computers at the cashier lines at the user's store(s) that the user wants to run the scan and link system 100.

The developer updates database 118 on a daily basis with barcodes for new products. However, there may be some barcodes which are not reflected in database 118. The user can select an option that allows the user to upload new barcodes for new products into database 118 that are missing. The user may also with this option create a new country and upload the barcodes corresponding to that country so that the scan and link system 100 may generate advice pop-ups for that specific country and industry sector. In one embodiment, the format of the uploaded file is a Microsoft Excel® spreadsheet with the following structure by columns: Sector (e.g.: pharmacy, perfumes, clothing, etc.); Country; Barcode; Product Name and Brand, Category (e.g.: dental, eau-de-cologne, shirts, etc.), or ATC class (in the case of drugs), Name of the Manufacturer, etc. Once uploaded, the developer indexes the information and adds it to database 118.

FIG. 3 shows a partial screen capture of the user interface top menu and FIG. 4 shows a screen capture of the My Account—Edit page in an embodiment of the scan and link system. Referring now to FIGS. 3 and 4, once the scan and link software has been installed on the cash register, by clicking on the Manual tab 314, a user's manual page (not shown) is returned to the user. By clicking on the My Account tab 302, the My Account—Edit page 400 (see FIG. 4) is returned to the user, which displays information about the user's account, and allows the user to change their password if desired and update or change other items as shown.

Figure 5:
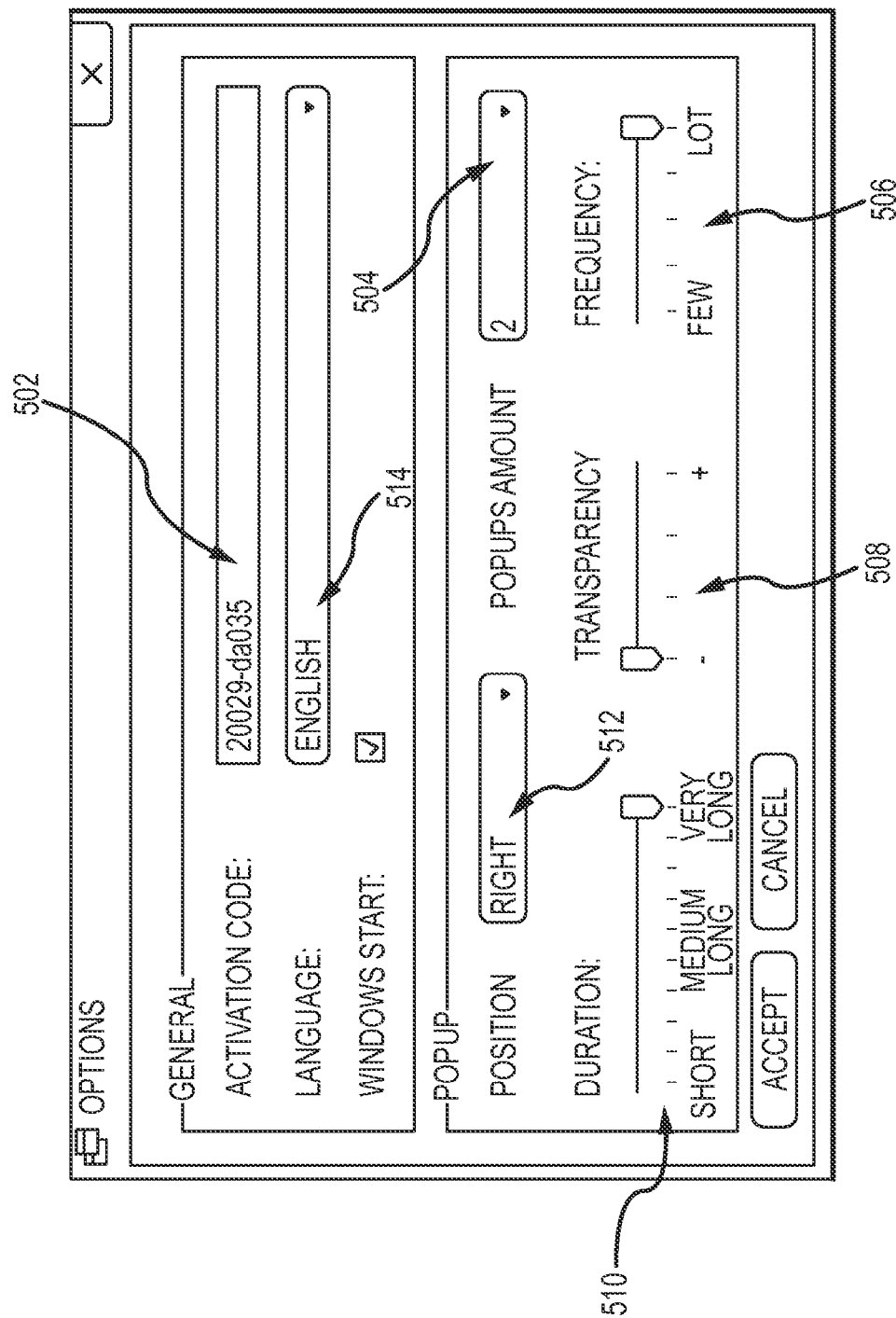
FIG. 5 shows a screen capture of the options page for defining an advice pop-up in an embodiment of the scan and link system.

FIG. 5 shows a screen capture of the options page for defining an advice pop-up in an embodiment of the scan and link system. Referring now to FIG. 5, the user has navigated to Options page 500 where activation code box 502 displays the activation code. The user can select between none, one, two, or three advice pop-ups to display at a time by clicking on the arrow in the pop-ups amount drop-down list 504. Frequency slider 506 allows the user to select from between few to lot. Frequency is directly linked to the relevance and importance of the advice. Less relevant sell advice pop-ups will not be shown if the frequency is set to "Few." Similarly, transparency slider 508 allows the user to select the advice pop-up from less to more important. Duration slider 510 allows the user to select how long the advice pop-ups last on the display, from a low of about three seconds to a high of about fifteen to twenty seconds. The user can select between right, left, low, and high for the display position of the advice pop-ups by clicking on the arrow in the pop-up drop-down list 512. The user can select the language of the pop-ups by clicking on the arrow in the language drop-down list 514.

Figure 6:
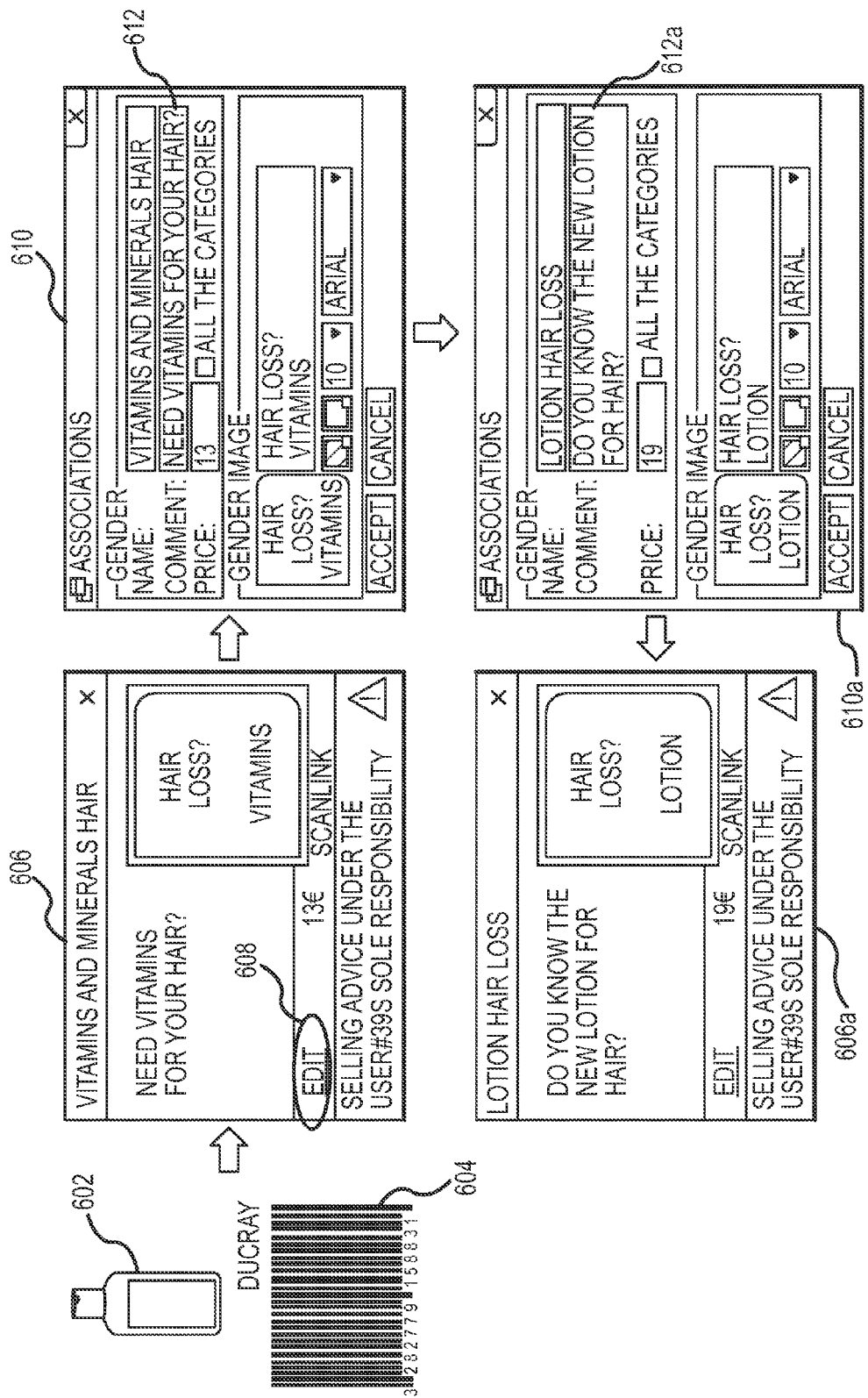
FIG. 6 shows a series of screen captures showing how an advice pop-up can be modified in embodiment of the scan and link system.

FIG. 6 shows a series of screen captures showing how an advice pop-up can be modified in an embodiment of the scan and link system. Referring now to FIG. 6, illustrated is a bottle of shampoo 602, and its barcode 604. After scanning the barcode, advice pop-up 606 is displayed on the display 104 of cash register 102. Should the cashier 106 desire to modify advice pop-up 606, the cashier can click on Edit 608 and the associations window 610 will be displayed. By clicking in Comment text box 612, cashier 106 can delete the existing text and type in new text as shown in the updated association window 610a and in Comment text box 612a. Instead of reading "Need vitamins for your hair?," modified advice pop-up 606a now reads "Do you know the new lotion for hair?" as shown in modified advice pop-up 606a.

FIGS. 7A and 7B show screen captures showing the effect of associating all categories of advice pop-ups in an embodiment of the scan and link system. Referring now to FIG. 7A, in associations window 710 the All the categories check box 702 is unchecked. When changes are made to the advice pop-up, the changes will only have affect for items in the same subcategory that originated the advice pop-up. In this example this means that only shampoos 704 that are scanned will generate the advice pop-up 706.

Referring now to FIG. 7B, All the categories check box 702 is now checked. When changes are made to the advice pop-up, the changes will have affect for all items from all subcategories that originated the advice pop-up (which in this example is hair in general). In this example this means that all hair products 708 that are scanned will generate the advice pop-up 706.

Figure 8:
FIG. 8 shows a screen capture of the stats page for analyzing the cross-selling performed in an embodiment of the scan and link system.

FIG. 8 shows a screen capture of the Stats page for analyzing the cross-selling performed in an embodiment of the scan and link system. Referring now to FIG. 3, clicking on the Stats tab 304 returns Stats page 800 as shown in FIG. 8. Stats page 800 presents an analysis of the cross-selling recommendations realized by the customer over a given period of time, such as daily, monthly, quarterly, and yearly. Monthly results are shown in FIG. 8. Column 802 indicates the category of product. Column 804 shows the total number of scans of items 1 shown in column 810 and items 2 shown in column 812. Column 806 shows the total times that items 1 and 2 have been sold together. Column 808 shows the ration percentage of cross-sales to scans. Column 814 indicates whether the advice pop-up already exists, indicated by "System," or whether an advice pop-up is suggested and could be deployed, indicated by "Suggested." The scan and link system "learns" from the customer's actual sales, and proposes new advice pop-ups for cross-selling. For example, if cross-selling is detected between vitamins and minerals for hair and lotion for hair loss (as shown in FIG. 6), to implement this "Suggested" advice pop-up, the user can click on the Implements Popups tab 308 (see FIG. 3) which returns the Implements pop-ups page 900 as shown in FIG. 9.

Figure 9:
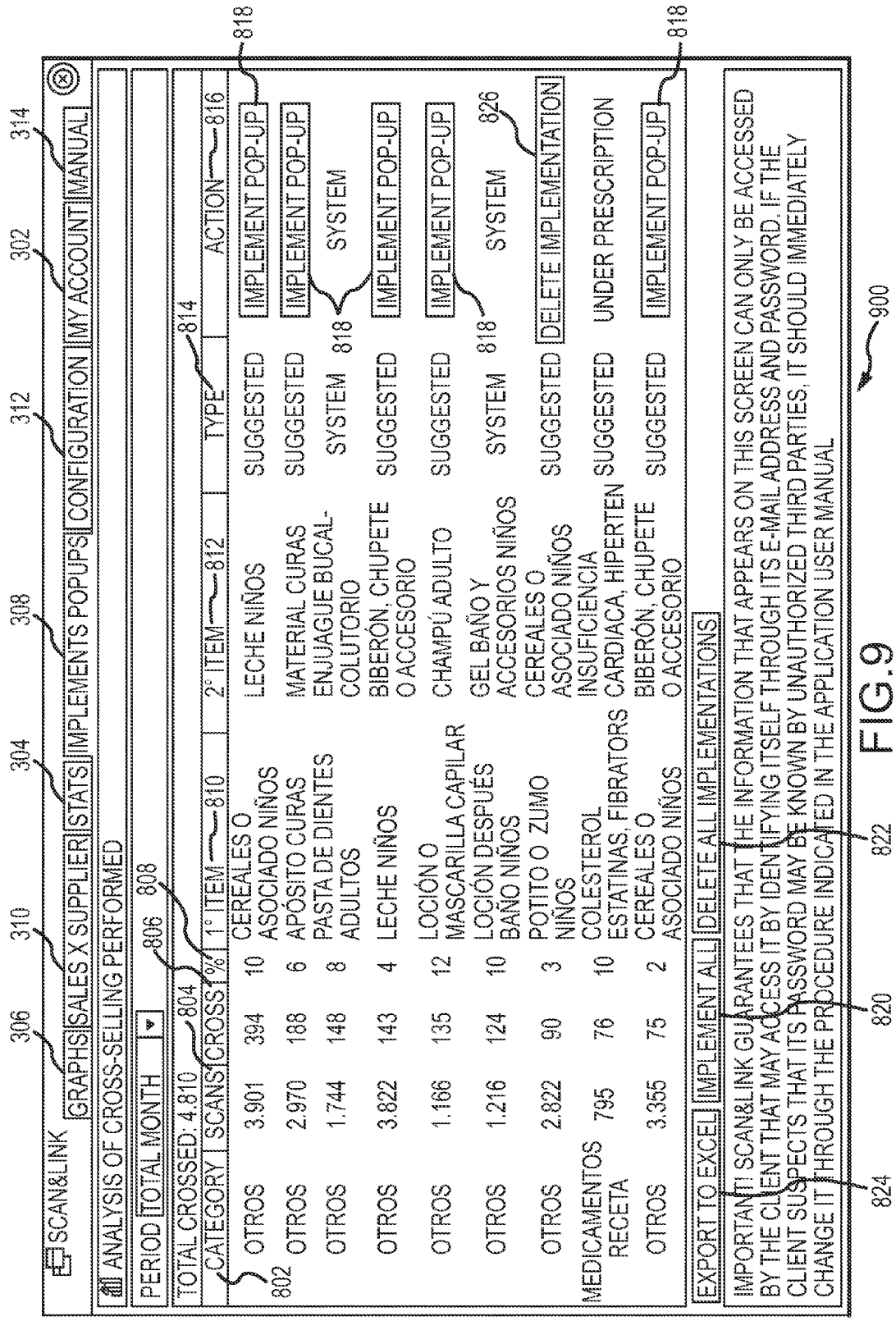
FIG. 9 shows a screen capture of the implements pop-ups page for implementing advice pop-ups in an embodiment of the scan and link system.

Referring now to FIG. 9, multiple buttons 818 are shown under the action column 816. For a given line entry, if item 1 is sold, item 2 would be the proposed advice pop-up, and vice versa. The implementation can be manual or automatic. Clicking on an individual button 818 invokes the manual implementation. Clicking on Implement All button 820 invokes the automatic implementation. After invoking the automatic implementation option, the new advice pop-up created can be modified as described above. It is possible to also remove all implemented advice pop-ups by clicking on Delete all implementations button 822. The data displayed in Stats page 800 or Implements pop-ups page 900 can also be exported to a Microsoft Excel® spreadsheet by clicking on the Export to excel button 824. Once a suggested advice pop-up has been implemented, the Action column 816 displays a Delete implementation button 826 in place of the Implement pop-up button 818. By clicking on button 826 the user can delete the advice pop-up that was created. The implemented advice pop-up will hide the first advice pop-up proposed by the scan and link system. By selecting that at least two advice pop-ups be displayed in the program options, the advice pop-up proposed by the system appears as well as the advice pop-up automatically implemented.

Figure 10:
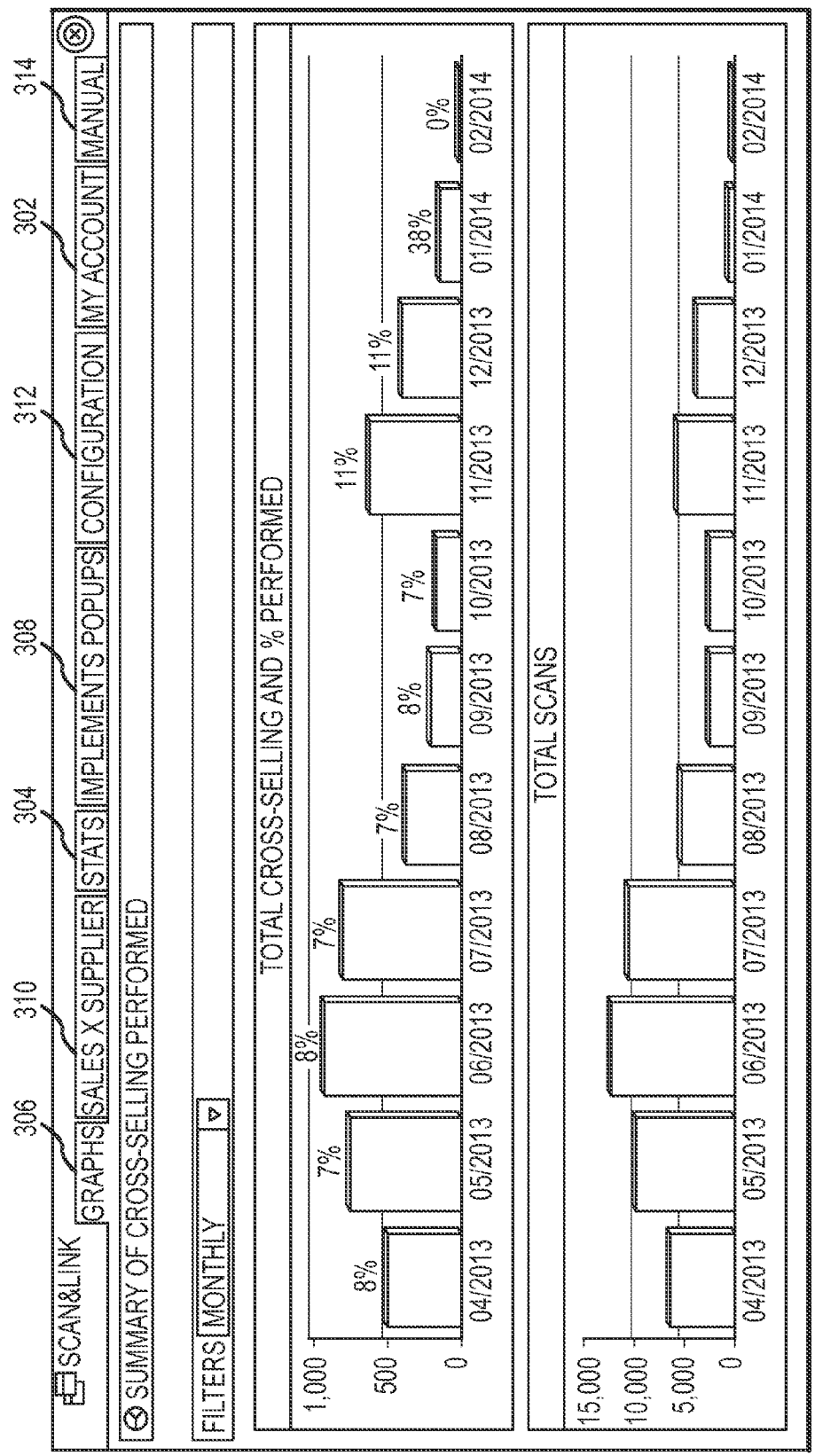
FIG. 10 shows a screen capture of the graphs page for analyzing the cross-selling performed in an embodiment of the scan and link system.

FIG. 10 shows a screen capture of the graphs page for analyzing the cross-selling performed in an embodiment of the scan and link system. Referring now to FIG. 10, clicking on the Graphs tab 306 returns Graphs page 1000 as shown in FIG. 10. Graphs page 1000 presents a graphical summary of the cross-selling operations performed by the user over a given period of time, such as daily, monthly, quarterly, and yearly. Monthly results are shown in FIG. 10 for the total percent of cross-selling realized and the total number of scans.

FIG. 11 shows a screen capture of the sales x supplier page for analyzing the cross-selling performed by specific suppliers in an embodiment of the scan and link system. Referring now to FIG. 311, clicking on the Sales x supplier tab 308 returns Sales x supplier page 1100 as shown in FIG. 11. It is possible to follow cross-sales performed by specific suppliers by clicking on the arrow in the supplier drop-down list 1102 and entering the code 1104 for the particular supplier of interest, Sales x supplier page 1100 displays the cross-selling performance for this particular supplier.

Figure 12:
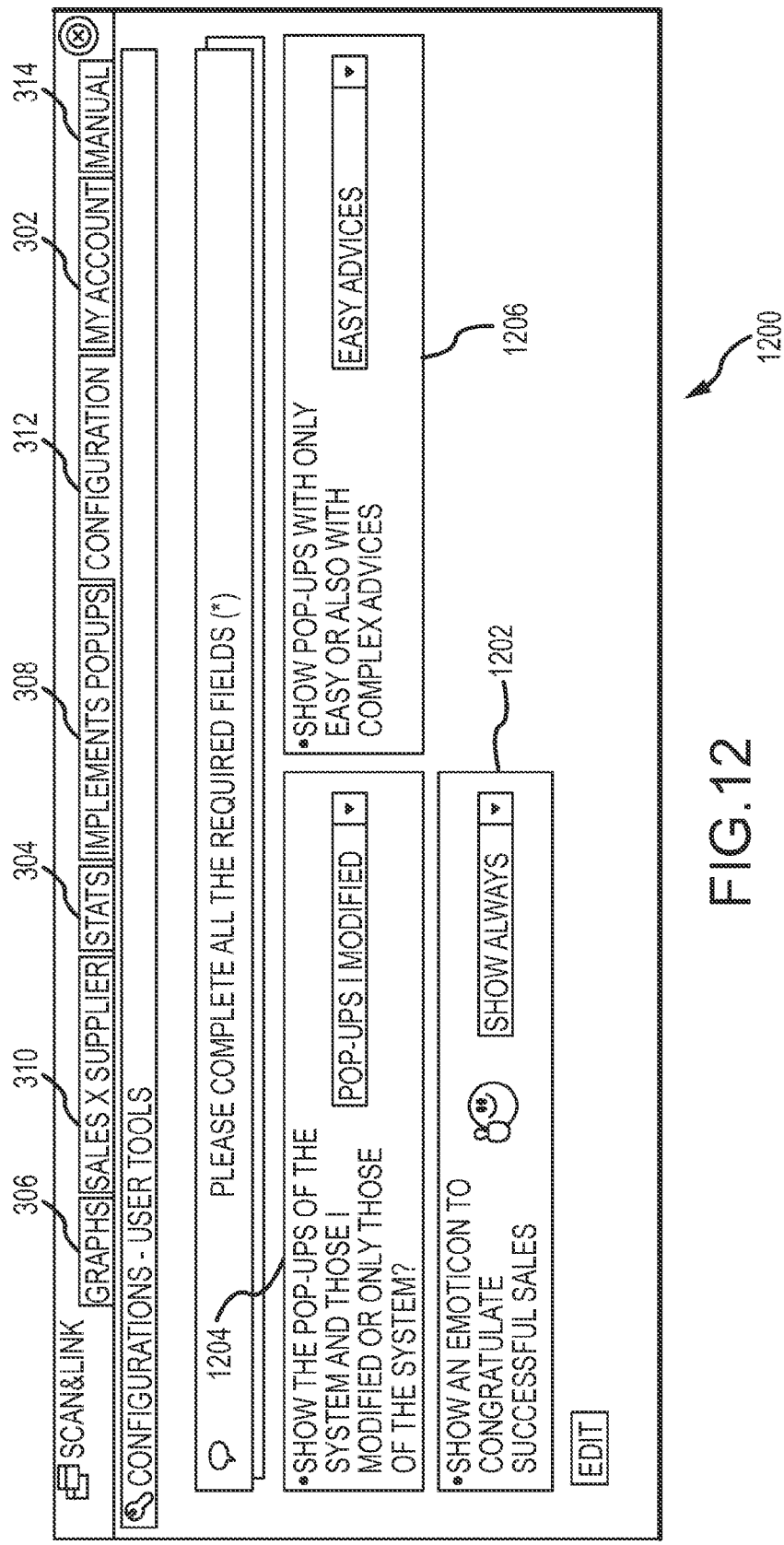
FIG. 12 shows a screen capture of the configuration page for personalizing the scan and link system in an embodiment of the scan and link system.

FIG. 12 shows a screen capture of the configuration page for personalizing the scan and link system in an embodiment of the scan and link system. Referring now to FIG. 3, clicking on the Configuration tab 312 returns Configuration page 1200 as shown in FIG. 12. The scan and link system can be personalized with additional settings. Selecting the drop-down list in dialogue box 1202 the user can choose to show an emoticon that congratulates the cashier 106 when there is a successful cross-sale. Other options include only showing the emoticon with cross-selling of products suggested in the advice pop-ups, or also with cross-selling of items similar to those proposed in the advice pop-ups. Selecting the drop-down list in dialogue box 1204 the user can choose to return to the original advice pop-up from the scan and link system, or use those that the user has modified. Selecting the drop-down list in dialogue box 1206 the user can choose to show advice pop-ups with easy advice only or also with complex advice.

Figure 13:
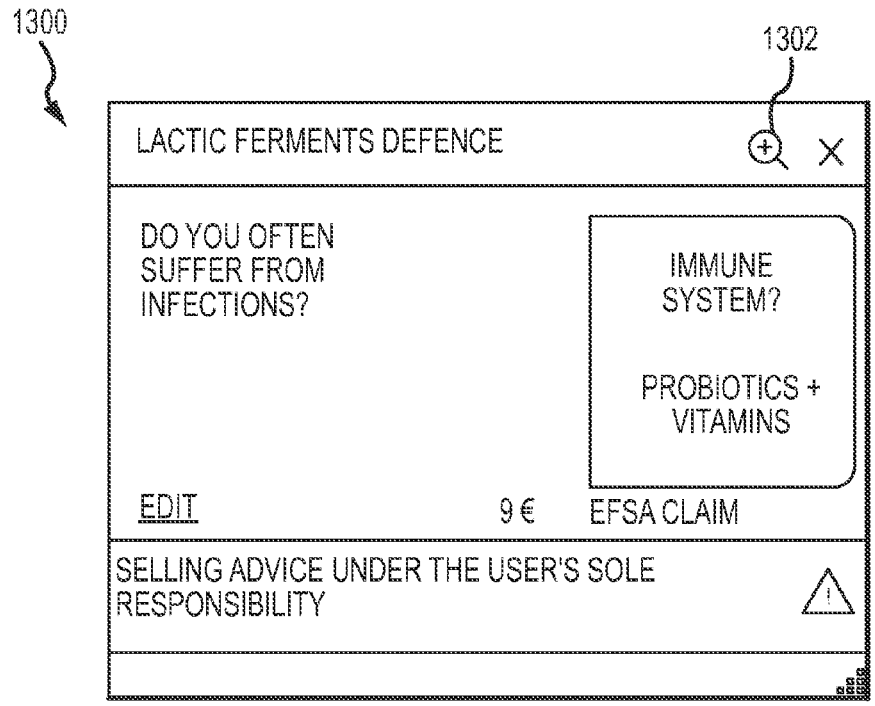
FIG. 13 shows a screen capture of an advice pop-up in an embodiment of the scan and view feature of the scan and link system.
Figure 14:
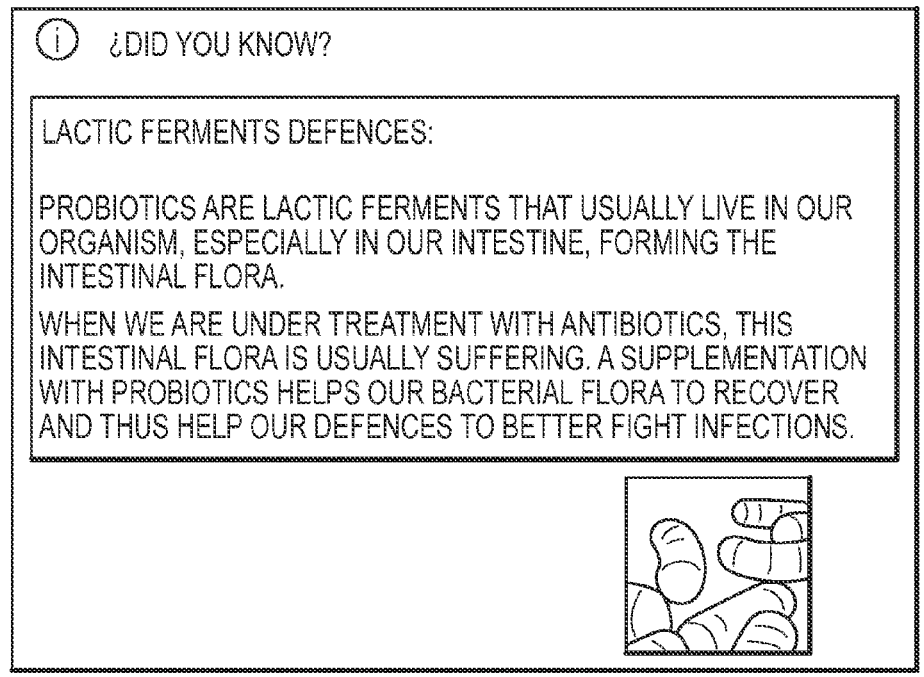
FIG. 14 shows a screen capture of an additional advice pop-up in an embodiment of the scan and view feature of the scan and link system.

FIGS. 13 through 19 show a scan and view feature in an embodiment of the scan and link system. FIG. 13 shows a screen capture of an advice pop-up in an embodiment of the scan and view feature of the scan and link system. Referring now to FIG. 13, for those cash registers 102 to 102n having a connected computer screen or tablet 105, advice pop-up 1300 is displayed. By clicking on magnifying glass button 1302, an additional advice pop-up is displayed as shown in FIG. 14.

Figure 15:
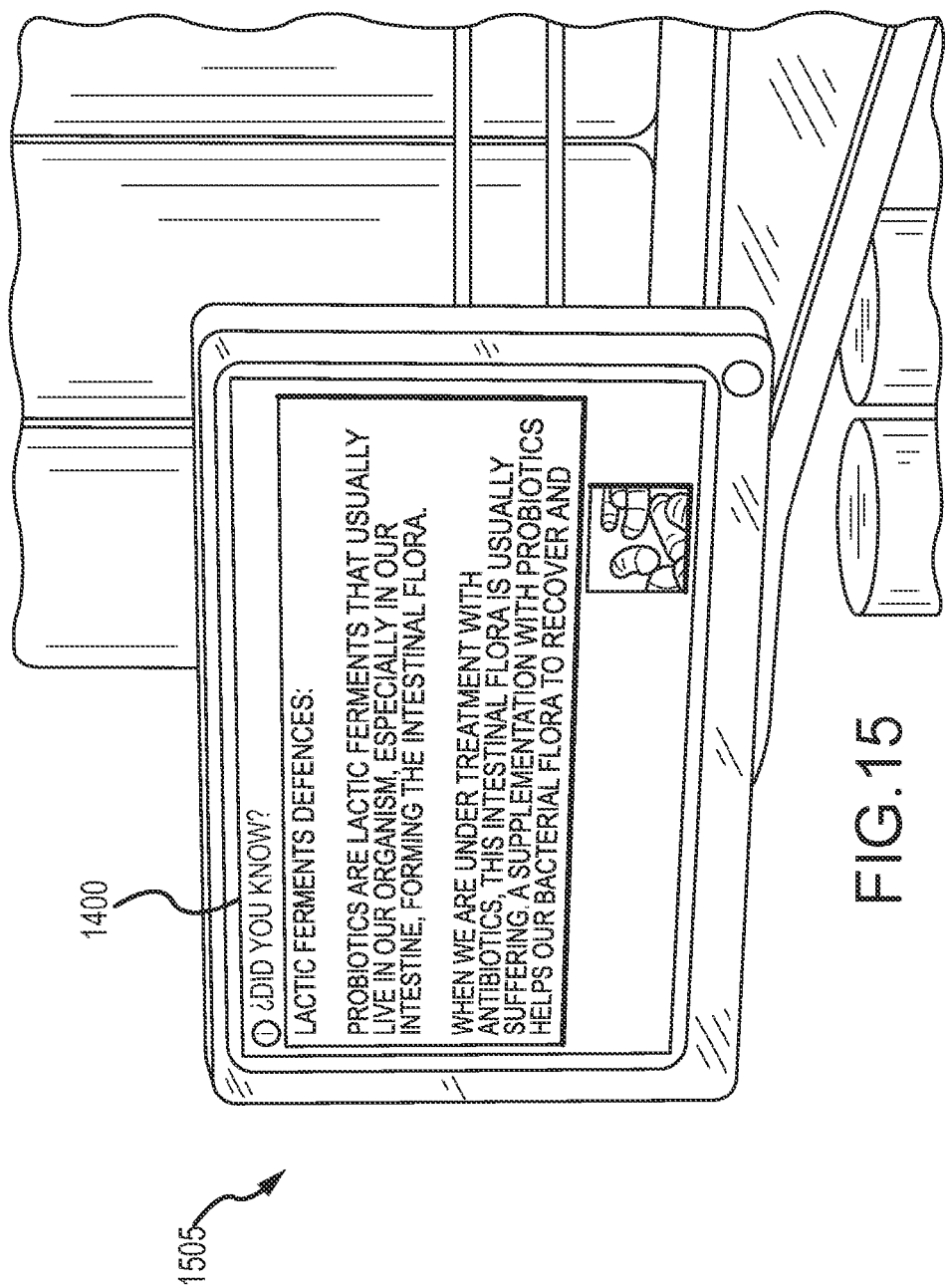
FIG. 15 shows a tablet device displaying the additional advice pop-up in an embodiment of the scan and view feature of the scan and link system.
Figure 16:
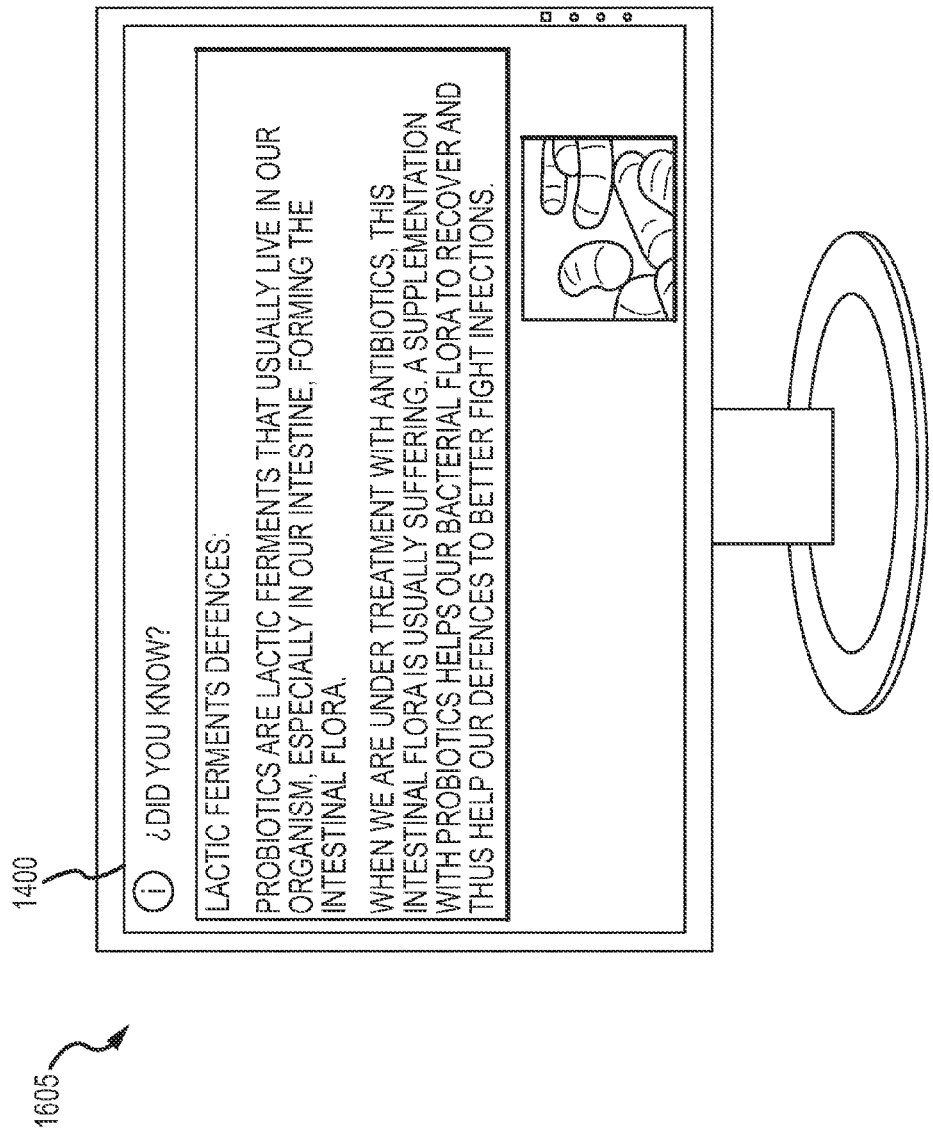
FIG. 16 shows a monitor device displaying the additional advice pop-up in an embodiment of the scan and view feature of the scan and link system.

FIG. 14 shows a screen capture of an additional advice pop-up in an embodiment of the scan and view feature of the scan and link system. Referring now to FIG. 14, additional advice pop-up 1400 is displayed on connected tablet 1505 as shown in FIG. 15, or connected monitor 1605 as shown in FIG. 16 as the case may be. Additional advice pop-up 1400 is also shown on display 104 of cash register 102 (see FIG. 18).

Figure 17:
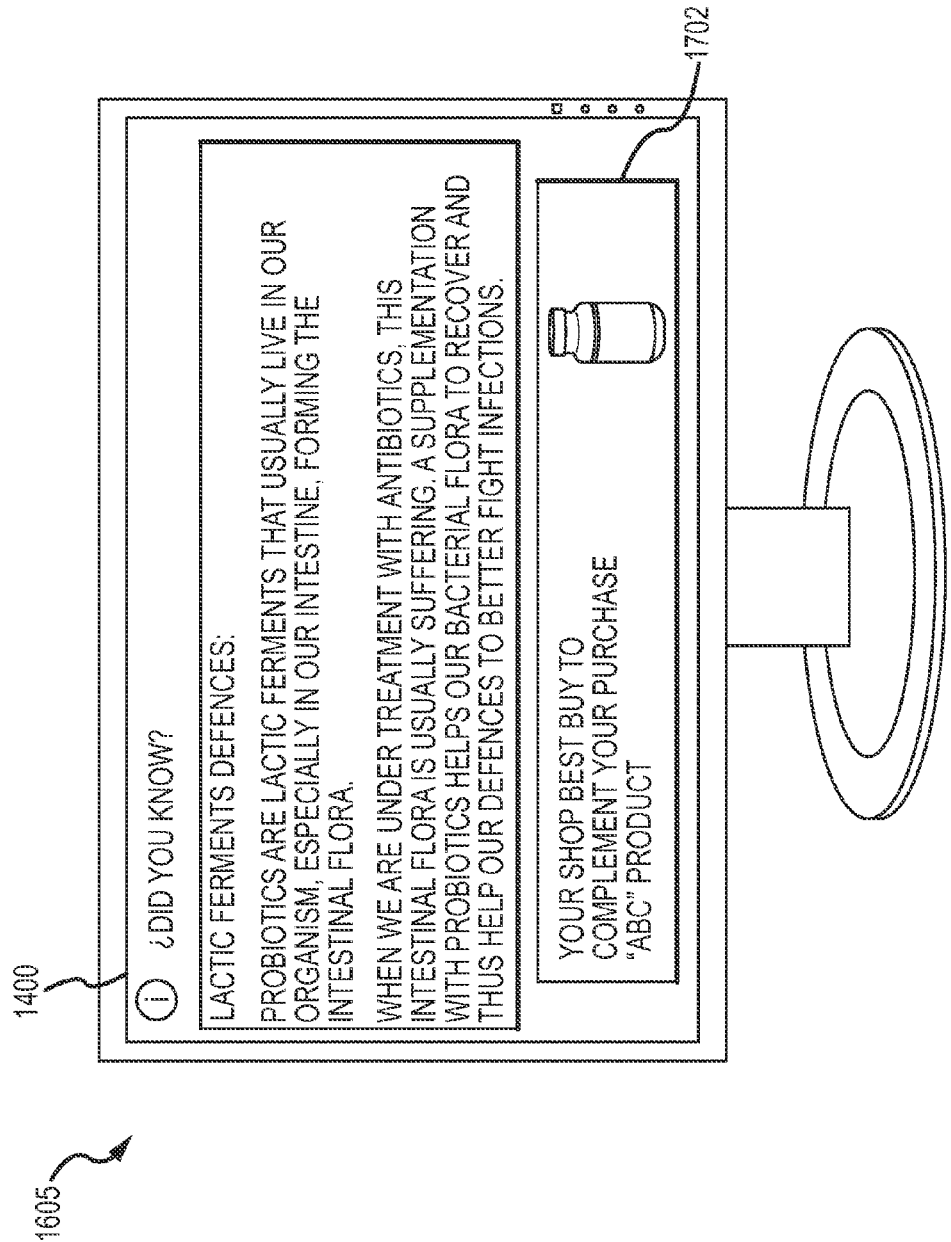
FIG. 17 shows a monitor device displaying the additional advice pop-up and a branded product in an embodiment of the scan and view feature of the scan and link system.

FIG. 17 shows a monitor device displaying the additional advice pop-up and a branded product in an embodiment of the scan and view feature of the scan and link system. Referring now to FIG. 17, instead of displaying a generic image of the complementary or associated product, a branded product 1702 can be designated for displayed through utilization by the user of the configuration page (see FIG. 19).

Figure 18:
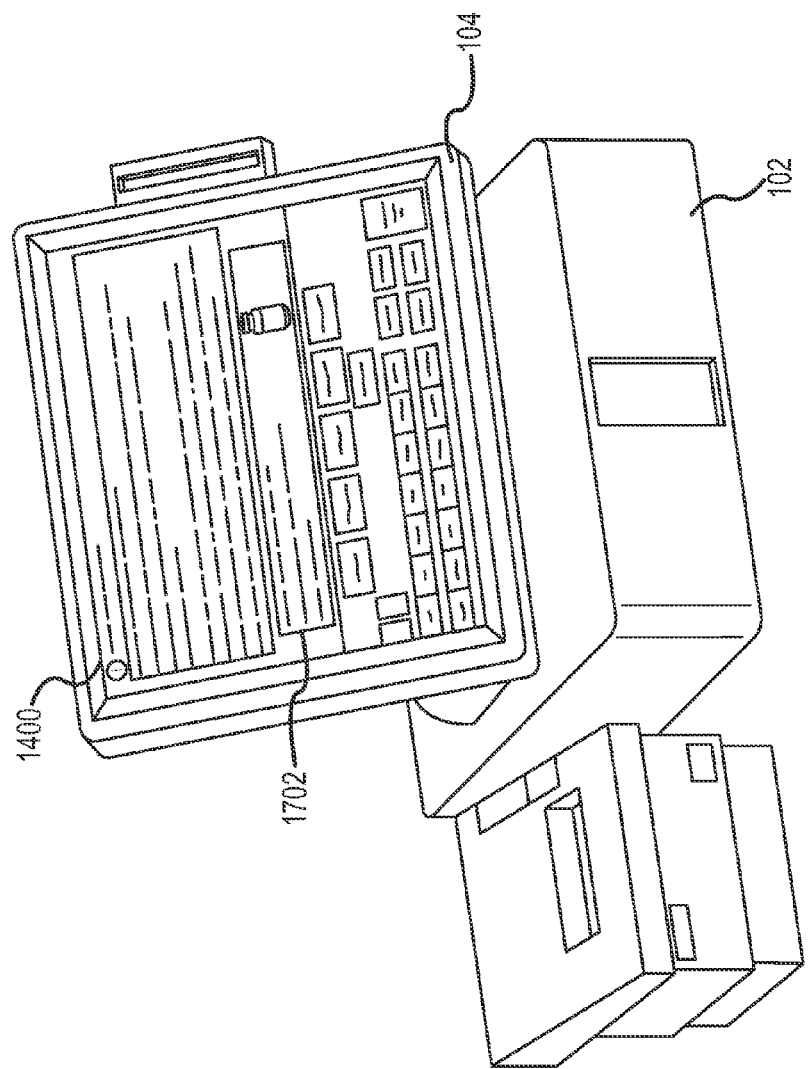
FIG. 18 shows a cash register displaying the additional advice pop-up and a branded product in an embodiment of the scan and view feature of the scan and link system.

FIG. 18 shows a cash register displaying the additional advice pop-up and a branded product in an embodiment of the scan and view feature of the scan and link system. Referring now to FIG. 18, additional advice pop-up 1400 is displayed on display 104 of cash register 102 along with the branded product 1702. This ensures that cashier 106 is seeing the same information that is being displayed to the customer on connected tablet 1505 or connected monitor 1605.

Figure 19:
FIG. 19 shows a screen capture of the configuration page for parameterization of a tablet or monitor in an embodiment of the scan and view feature of the scan and link system.

FIG. 19 shows a screen capture of the configuration page for parameterization of a tablet or monitor in an embodiment of the scan and view feature of the scan and link system. Referring now to FIG. 19, for cash registers 102 to 102n equipped with either a connected tablet 1505 or connected monitor 1605 that can be directed to the customer, the user can check the appropriate boxes displayed in the parameters section 1902, carousel store section 1904, and the content of store popups section 1906, to configure the scan and view feature as desired.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. A method for cross-selling, the method comprising the steps of:
   (a) receiving in a secure server a barcode for a product scanned at a cash register at a point-of-sale;
   (b) checking a database for at least one associated or complimentary product related to the product;
   (c) sending at least one advice pop-up from the secure server to a display of the cash register at the point-of-sale, wherein the at least one advice pop-up contains an input button, a suggested question, and an information about the at least one associated or complimentary product, the suggested question posed to a customer at the point-of-sale by a cashier;
   (d) receiving in the secure server click input on the input button initiated by the cashier; and
   (e) sending from the secure server an additional advice pop-up to the display of the cash register at the point-of-sale and to a display of a tablet or monitor connected to the cash register at the point-of-sale.

2. The method for cross-selling according to claim 1 further comprising the step of:
   storing in a database accessible by the secure server a plurality of associated or complimentary products related to a plurality of other products.

3. The method for cross-selling according to claim 1 further comprising the step of:
   receiving in the secure server click input on an edit button initiated by the cashier in the at least one advice pop-up displayed on the display of the cash register;
   sending an associations window from the secure server to the display of the cash register at the point-of-sale, wherein a comment text box is displayed in the associations window;
   receiving in the secure server a modified text inputted by the cashier the comment text box; and
   sending from the secure server the modified text for display in the at least one advice pop-up displayed in the display of the cash register at the point-of-sale.

4. The method for cross-selling according to claim 3 further comprising the step of:
   receiving in the secure server click input on an all the categories check box in the associations window, wherein the modified text will be applied to a plurality of subcategories that originate the at least one advice pop-up instead of just the same subcategory that originated the at least one advice pop-up.

5. The method for cross-selling according to claim 1 wherein step (e) further comprises the step of:
   displaying a branded product in the additional advice pop-up displayed on the display of the cash register at the point-of-sale and on the display of the tablet or monitor connected to the cash register at the point-of-sale.

6. The method for cross-selling according to claim 1 further comprising the step of:
   displaying on the display of the cash register a stats page that shows a plurality of pairs of products and the frequency with which each pair of products were sold together, and displays whether an advice pop-up already exists for the pair of products;
   displaying an implement pop-up button for each pair of products where an advice pop-up does not exist;
   receiving in the secure server click input on at least one of the implement pop-up buttons; and
   creating a new advice pop-up relating the pair of products associated with the at least one implement pop-up button.

7. The method for cross-selling according to claim 1 further comprising the step of:
   displaying an emoticon on the display of the cash register at the point-of-sale when the at least one associated or complimentary product is sold with the product.

8. A system for cross-selling, the system comprising:
   a plurality of cash registers located at a plurality of points-of-sale, each of the plurality of cash registers having a first display, a scanner, and a connected tablet or monitor having a second display;
   a secure server in communication with each of the plurality of cash registers for receiving a plurality of barcodes scanned from a plurality of products from the plurality of cash registers at the plurality of points-of-sale; and
   a database for storing at least one associated or complimentary product related to each of the plurality of products;
   wherein upon receiving the plurality of barcodes scanned from the plurality of products, the secure server sends a plurality of advice pop-ups for display on the first displays of the plurality of cash registers, each of the plurality of advice pop-ups containing an input button, a suggested question, and an information about the at least one associated or complimentary product, wherein the suggested questions are posed to a plurality of customers at the points-of-sale by a plurality of cashiers, and upon receiving click input on the input buttons initiated by the plurality of cashiers the secure server sends an additional advice pop-ups to the first displays of the cash registers at the points-of-sale and to the second displays of the tablets or monitors.

9. The system for cross-selling according to claim 8 further comprising:
   an edit button in the plurality of advice pop-ups displayed on the first displays of the plurality of cash registers, wherein click input on the edit button initiated by the plurality of cashiers is received in the secure server; and
   an associations window having a comment text box which is sent by the secure server in response to the click input on the edit button to the first displays of the plurality of cash registers at the points-of-sale;
   wherein a modified text entered into the comment text box by the plurality of cashiers is received by the secure server and the secure server sends the modified text for display in the plurality of advice pop-ups displayed in the first displays of the plurality of cash registers at the points-of-sale.

10. The system for cross-selling according to claim 9 further comprising:
    an all the categories check box in the associations window, wherein when the secure server receives click input on the all the categories check box, the modified text will be applied to a plurality of subcategories that originate the plurality of advice pop-ups instead of just the same subcategory that originated the plurality of advice pop-ups.

11. The system for cross-selling according to claim 8 wherein a branded product is displayed in the additional advice pop-up displayed on the first display of the plurality of cash registers at the points-of-sale and on the second display of the tablet or monitor connected to the plurality of cash registers at the points-of-sale.

12. The system for cross-selling according to claim 8 further comprising:
   a stats page displaying on the first display of the plurality of cash registers that shows a plurality of pairs of products and the frequency with which each pair of products were sold together, and displays whether an advice pop-up already exists for the pair of products; and
   an implement pop-up button displayed for each pair of products where an advice pop-up does not exist;
   wherein upon the secure server receiving click input on the implement pop-up button the secure server creates a new advice pop-up relating the pair of products associated with the implement pop-up button.

13. The system for cross-selling according to claim 8 further comprising:
   an emoticon displayed on the first display of the plurality of cash registers at the points-of-sale when the at least one associated or complimentary product is sold with the product.

14. A method for cross-selling, the method comprising the steps of:
   (a) scanning a barcode for a product at a cash register at a point-of-sale, wherein the barcode scanned is sent to a secure server;
   (b) receiving from the secure server at least one advice pop-up that is displayed on a display of the cash register at the point-of-sale, wherein the at least one advice pop-up contains an input button, a suggested question, and an information about at least one associated or complimentary product, the suggested question posed to a customer at the point-of sale by a cashier;
   (c) clicking on the input button by the cashier, wherein the input button click input is sent to the secure server; and
   (d) receiving from the secure server an additional advice pop-up that is displayed on the display of the cash register at the point-of-sale and is displayed on a display of a tablet or monitor connected to the cash register at the point-of-sale.

15. The method for cross-selling according to claim 14 further comprising the step of:
   clicking on an edit button by the cashier displayed in the at least one advice pop-up, wherein the edit button click input is sent to the secure server;
   receiving from the secure server an associations window that is displayed on the display of the cash register at the point-of-sale, wherein a comment text box is displayed in the associations window;
   inputting into the comment text box by the cashier a modified text, wherein the modified text input is sent to the secure server; and
   receiving from the secure server the modified text that is displayed in the at least one advice pop-up in the display of the cash register at the point-of-sale.

16. The method for cross-selling according to claim 15 further comprising the step of:
   clicking on an all the categories check box in the associations window, wherein the all the categories check box click input is sent to the secure server causing the modified text to be applied to a plurality of subcategories that originate the at least one advice pop-up instead of just the same subcategory that originated the at least one advice pop-up.

17. The method for cross-selling according to claim 14 wherein step (d) further comprises the step of:
   receiving from the secure server a branded product that is displayed in the additional advice pop-up displayed on the display of the cash register at the point-of-sale and on the display of the tablet or monitor connected to the cash register at the point-of-sale.

18. The method for cross-selling according to claim 14 further comprising the step of:
   clicking on a stats tab displayed on the display of the cash register which causes a stats page to be displayed that shows a plurality of pairs of products and the frequency with which each pair of products were sold together, and displays whether an advice pop-up already exists for the pair of products; and
   clicking on an implement pop-up button displayed on the stats page for each pair of products where an advice pop-up does not exist, wherein the implement pop-up button click input is sent to the secure server causing the secure server to create a new advice pop-up relating the pair of products associated with the at least one implement pop-up button.

19. The method for cross-selling according to claim 14 further comprising the step of:
   displaying an emoticon on the display of the cash register at the point-of-sale when the at least one associated or complimentary product is sold with the product.

* * * * *